(12) United States Patent
Lindback et al.

(10) Patent No.: US 12,097,563 B2
(45) Date of Patent: Sep. 24, 2024

(54) INDEXING SYSTEM FOR A MILLING TOOL

(71) Applicant: AB SANDVIK COROMANT, Sandviken (SE)

(72) Inventors: Daniel Lindback, Sodertalje (SE); Predrag Jagunic, Uppsala (SE); Markus Lindmark, Umea (SE); Jens Ljung, Ornskoldsvik (SE); Tomas Vannucci, Lulea (SE); Anders Almkvist, Sandviken (SE)

(73) Assignee: AB SANDVIK COROMANT, Sandviken (SE)

( * ) Notice: Subject to any disclaimer, the term of this patent is extended or adjusted under 35 U.S.C. 154(b) by 504 days.

(21) Appl. No.: 17/253,308

(22) PCT Filed: Mar. 14, 2019

(86) PCT No.: PCT/EP2019/056467
§ 371 (c)(1),
(2) Date: Dec. 17, 2020

(87) PCT Pub. No.: WO2019/242897
PCT Pub. Date: Dec. 26, 2019

(65) Prior Publication Data
US 2021/0362247 A1 Nov. 25, 2021

(30) Foreign Application Priority Data
Jun. 21, 2018 (EP) .................................... 18179111

(51) Int. Cl.
*B23C 5/06* (2006.01)
(52) U.S. Cl.
CPC ............ *B23C 5/06* (2013.01); *B23B 2205/18* (2013.01); *B23C 2210/163* (2013.01)

(58) Field of Classification Search
CPC ... B23C 5/2226; B23C 5/2295; B23C 5/2213; B23C 5/2208; B23C 5/2298;
(Continued)

(56) References Cited

U.S. PATENT DOCUMENTS 4,024,777 A * 5/1977 Fogarty ................. B23Q 16/06
408/35
4,541,165 A 9/1985 Sawai et al.
(Continued)

FOREIGN PATENT DOCUMENTS

EP 2933047 A1 10/2015
JP H04176505 A 6/1992

*Primary Examiner* — Ryan Rufo
(74) *Attorney, Agent, or Firm* — Corinne R. Gorski

(57) ABSTRACT

A milling tool includes an internal indexing mechanism arranged to displace an indexable cutting insert between an inner supported position and an outer indexing position. The indexable cutting insert has a multi-sided shape as seen in the direction of an insert centre axis and side support surfaces are included in the sides of the multi-sided indexable cutting insert. The internal indexing mechanism is arranged to provide a rectilinear movement along the shaft centre axis, between the inner supported position and the outer indexing position, wherein the indexable cutting insert is free to turn in both directions around the insert centre axis in the outer indexing position. An external indexing device for the milling tool and an indexing system is also provided. A disc member is configured with an annular geometry arranged to engage one of the side support surfaces and turn the indexable cutting insert toward the next index position.

13 Claims, 12 Drawing Sheets

(58) Field of Classification Search
CPC ... B23C 5/2301; B23C 5/2304; B23C 5/2309; B23C 5/22; B23C 5/24; B23C 5/006; B23C 5/06; B23C 5/08; B23C 2210/163; B23C 2210/161; B23C 2210/246; B23C 2210/506; B23C 2260/84; B23C 2260/04; B23C 2200/367; B23C 2200/168; B23B 2205/18; B23B 2205/21; Y10T 483/1712
See application file for complete search history.

(56) References Cited

U.S. PATENT DOCUMENTS

| | | | |
|---|---|---|---|
| 4,730,525 A * | 3/1988 | Kelm | B23B 27/1659 29/48.5 R |
| 9,737,939 B2 * | 8/2017 | Norstedt | B23C 5/2252 |
| 9,981,324 B2 * | 5/2018 | Norstedt | B23C 5/2239 |
| 2017/0028483 A1 * | 2/2017 | Norstedt | B23C 5/06 |
| 2017/0036280 A1 * | 2/2017 | Norstedt | B23C 5/2213 |

* cited by examiner

INDEXING SYSTEM FOR A MILLING TOOL

RELATED APPLICATION DATA

This application is a § 371 National Stage Application of PCT International Application No. PCT/EP2019/056467 filed Mar. 14, 2019 claiming priority to EP 18179111.2 filed Jun. 21, 2018.

TECHNICAL FIELD OF THE INVENTION

The invention relates to a milling tool for chip-removing machining having an internal indexing mechanism. Milling tools of the present invention are primarily intended for face and/or shoulder milling in workpieces of metal. The invention also relates to an external indexing device for the milling tool, as well as an indexing system comprising the milling tool and the external indexing device.

BACKGROUND OF THE INVENTION AND PRIOR ART

The invention has its origin in problems, which are particularly associated with milling tools, such as face and/or shoulder milling tools, that may be equipped with a relatively large number of indexable cutting inserts that require an indexing operation as the cutting edges become worn. An indexing operation is usually in practice performed manually, whereby the indexable cutting inserts are detached one by one and thereafter mounted again into a new index position with an unused cutting edge arranged for active cutting. The manual indexing operation is time-consuming, since each indexable cutting insert is individually detached by removing its fastening member (screw or clamping wedge), whereupon each indexable cutting insert is indexed by hand into the new index position and mounted again by attaching the fastening member. The milling tool is hereby taken out of operation (from a milling machine) for the manual indexing operation.

There are prior art documents aimed at facilitating the indexing operation in milling tools. Theses milling tools are in general provided with an internal indexing mechanism configured to rectilinearly move the indexable cutting insert out of the seat and also turn the indexable cutting insert into the next index position when the internal indexing mechanism is actuated.

EP2933047 discloses such a milling tool comprising an internal indexing mechanism or ejector including turning means for transforming a rectilinear motion into simultaneous turning of the indexable cutting insert into the next index position. It describes a problem with prior art U.S. Pat. No. 4,024,777 disclosing a tool having a seat with side contact surfaces for a multi-sided indexable cutting insert. More precisely, the problem is that the tolerance chain, between the turning means that determines the next index position of the multi-sided indexable cutting insert and the side contact surfaces that are included in the seat, becomes long and inaccurate, involving the risk of imprecise fitting of the insert into the seat during the indexing operation. EP2933047 hereby discloses an outer end of the ejector being provided with a seat for an indexable cutting insert having a rather complex geometry. Hence, it would be beneficial if improved precision in the turning could be achieved so that an indexing mechanism could be used reliably for the indexing of a more conventional multi-sided or polygonal shaped indexable cutting insert (less complex geometry) that is supported by side contact surfaces in the seat of the tool body.

JPH04176505 discloses another milling tool having an internal indexing mechanism for a round cutting insert arranged in a seat having an arc-shaped side contact surface. The internal indexing mechanism comprises a clamp rod, which is laterally moved along a slope, whereby the round insert is separated from the arc-shaped side contact surface of the seat. The internal indexing mechanism further comprises an indexing rod, which is pushed to turn the round insert into the next index position. The arc-shaped side contact surface is a more forgiving design in terms of the above mentioned problematic tolerance chain, since the round insert will always fit into the seat having the corresponding arc-shaped side contact surface. Hence, the round insert does not run the risk of getting stuck due to an imprecise turning in the indexing operation. JPH04176505 does not however disclose a solution for a non-round or multi-sided (e.g. polygonal shaped) indexable cutting insert being supported by corresponding non-round or flat side contact surfaces in the seat, whereby even minor imprecisions in the internal turning mechanism would cause an incorrect fitting of the non-round or multi-sided (e.g. polygonal shaped) indexable cutting insert and thereby prevent it from being pulled back into the seat.

SUMMARY OF THE INVENTION

The primary object of the present invention is that of providing a milling tool having an indexing mechanism enabling a precise and reliable indexing of an indexable cutting insert having a multi-sided shape. In a first aspect of the present invention, the milling tool for chip-removing machining comprises:

a tool body being rotatable around a centre axis, the tool body comprising at least one insert seat with a plurality of side contact surfaces, at least one indexable cutting insert including an insert centre axis around which the indexable cutting insert has a rotational symmetry, wherein the indexable cutting insert has a plurality of side support surfaces, which are situated around the insert centre axis and arranged to be supported by the side contact surfaces of the insert seat, at least one internal indexing mechanisms being arranged to displace the indexable cutting insert between an inner supported position, wherein at least two of the side support surfaces are supported by at least two side contact surfaces, and an outer indexing position, wherein the at least two side support surfaces are out of contact with the two side contact surfaces, the internal indexing mechanism having a shaft member with a shaft centre axis extending inside a bore formed in the tool body, the indexable cutting insert being connected at a first end of the shaft member and a second end of the shaft member being arranged for pushing the shaft member with the indexable cutting insert to the outer indexing position, wherein the shaft member is forced toward the inner supported position by a compressible force generator.

The milling tool is characterised in that the indexable cutting insert has a multi-sided shape as seen in the direction of the insert centre axis and the side support surfaces are included in the sides of the multi-sided indexable cutting insert, wherein the internal indexing mechanism is arranged to provide a rectilinear movement along the shaft centre axis, between the inner supported position and the outer indexing position, wherein the indexable cutting insert is free to turn in both directions around the insert centre axis in the outer indexing position. A multi-sided indexable insert should hereby be construed as encompassing both a polygonal shaped indexable cutting insert having straight sides (planar side support surfaces) as well as an indexable cutting insert with a plurality of sides including support surfaces that deviate from a straight/planar shape (such as concavely shaped side support surface). It may be noted that the internal indexing mechanism is preferably arranged to only provide the rectilinear movement along the shaft centre axis, although the internal indexing mechanism may allow a minute transverse movement close to the inner supported position as the support surfaces of the cutting insert disengages/engages the contact surfaces of the insert seat. Such minute transverse movement is however in the order of fractions of a millimetre, whereby the movement between the inner supported position and the outer indexing position can in all practical aspects be considered as only rectilinear.

The invention is based on the idea of providing an internal indexing mechanism in the milling tool that (only) provides a rectilinear movement between the inner supported position and the outer indexing position, wherein the multi-sided indexable cutting insert is free to turn in both directions around its centre axis in the outer indexing position. Hence, the internal indexing mechanism of the milling tool does not include an internal turning mechanism or means providing a simultaneous turning of the multi-sided indexable cutting insert into a defined position, because such internal turning mechanisms also prevent the insert from being free to turn in both directions around its centre axis in the outer indexing position. In other words, the internal turning mechanism of the prior art fixates the indexable cutting insert in an angular position that prevents it from being turned externally in the outer indexing position or adjusted while it slides back into the seat. The internal indexing mechanism of the present invention on the other hand allows the multi-sided indexable cutting insert to turn freely in both directions around its centre axis in the outer indexing position, so that the indexable cutting insert can be turned into the correct index position by an external indexing device or adjusted into the correct angular position by the contact surfaces as it slides back into the seat.

In an embodiment of the milling tool, the bore and the shaft member arranged therein extend in a radial direction of the tool body, wherein the second end for pushing the shaft member is projecting from the bore into a central cavity, which is formed in the tool body and extends coaxially with the centre axis of the tool body. The internal indexing mechanism(s) is/are in this way easily accessible in the central cavity and several indexable cutting inserts may be pushed to their outer indexing position by an external indexing device. The central cavity is preferably provided in a front end of the tool body, which is accessible while the milling tool is mounted at the rear end to a milling machine. Hence, the milling machine can perform the indexing operation automatically by bringing the front end toward an external indexing device.

In a further embodiment, the milling tool comprises a plurality of identical indexable cutting inserts being connected to a plurality of internal indexing mechanisms, wherein the second ends of the shaft members are projecting into the central cavity provided in the front end of the tool body. In this way, all the indexable cutting inserts can be indexed simultaneously and a milling machine can beneficially perform the indexing operation automatically.

In an embodiment of the milling tool, the indexable cutting insert is a tangentially mounted cutting insert, wherein the two side contact surfaces are arranged to support the indexable cutting insert in an axial and a tangential direction of the tool body. The milling tool can in this way be configured for face and/or shoulder milling with a milling machine performing an automatic indexing operation of all the tangential cutting inserts by engaging an external indexing device.

In a further embodiment of the milling tool, the tangential indexable cutting insert is fixedly mounted to the first end of the shaft member with the insert centre axis arranged coaxially with the shaft centre axis, wherein the indexable cutting insert is free to turn in both directions around the insert centre axis in the outer indexing position by the shaft member being rotatably supported inside the bore around the shaft centre axis. The internal indexing mechanism hereby exhibits a simple and reliable design comprised of few parts by the tangential cutting insert being firmly attached to the first end of the shaft member with for instance an insert screw, wherein the insert is turnable together with the shaft member during the indexing operation.

In a further embodiment, the tangential indexable cutting insert comprises a through-hole arranged coaxially with the insert centre axis, wherein the first end of the shaft member comprises an internally threaded hole extending coaxially with the shaft centre axis, wherein the indexable cutting insert is directly connected to the first end of the shaft member with an insert screw mounted in the through-hole into the internally threaded hole of the shaft member.

In another embodiment of the milling tool, the indexable cutting insert is a radially mounted cutting insert, wherein the two side contact surfaces are arranged to support the indexable cutting insert in an axial and a radial direction of the tool body. The milling tool can in this way be configured for face milling with a milling machine performing an automatic indexing operation of all the radially mounted inserts by means of an external indexing device. The radially mounted cutting insert for face milling generally comprises an active main cutting edge arranged in the tool body at a setting angle less than 90° (e.g. 45° in relation to the workpiece surface, wherein the multi-sided (polygonal shaped) and radially mounted indexable cutting insert is preferably provided with at least four identical/indexable cutting edges along at least an upper side of the cutting insert, and even more preferably more than four indexable cutting edges (such as at least six indexable cutting edges). This improves the machining economy in the face milling operation by providing a relatively large number of indexable cutting edges that can be indexed reliably and automatically, while remaining in operation, with the internal indexing mechanisms actuated when the active main cutting edges are worn out. The radially mounted cutting insert can be configured as a double-sided cutting insert having identical indexable cutting edges also along a lower side of the indexable cutting insert, whereby the indexable cutting insert can be detached and reversed when all the indexable cutting edges along the upper side has been worn out.

In a further embodiment of the milling tool, the radially mounted indexable cutting insert is connected to the first end of the shaft member via an insert head, wherein the insert head comprises a cylindrical projection extending across the shaft centre axis and the radially mounted cutting insert comprises a central through-hole extending coaxially with the insert centre axis, wherein the cylindrical projection is arranged in the central through-hole so that the radially mounted indexable cutting insert is free to turn around its centre axis on the cylindrical projection in the outer indexing position. Hence, the cylindrical projection is projecting at an angle (approximately perpendicularly) to the shaft centre axis and is supporting the radially mounted indexable cutting insert around the insert centre axis in the outer indexing position, wherein (in the inner supported position) the radially mounted cutting insert is arranged between the insert head and a bottom support surface of the seat.

In yet a further embodiment of the milling tool, the insert head comprises a cylindrical portion, which is extending coaxially with the shaft centre axis to moveably support the shaft member's rectilinear movement along the shaft centre axis in the bore of the tool body.

In a second aspect of the invention, the precise and reliable indexing operation is enabled by an external indexing device, which is used for indexing the indexable cutting inserts in the milling tool of the present invention. The external indexing device comprises a central punch, which is protruding from a surrounding disc member, wherein the central punch is arranged for pushing the second end of the shaft member of the internal indexing mechanism so that the multi-sided indexable cutting insert is displaced to the outer indexing position, wherein the surrounding disc member is configured with an annular geometry arranged to engage one of the sides on the multi-sided indexable cutting insert and, when a further relative movement is provided between the milling tool and the external indexing device, to turn the indexable cutting insert around the insert centre axis into the next index position.

The external indexing device of the present invention can be manufactured at sufficient precision for an accurate indexing of the multi-sided indexable cutting insert into the next index position, which ensures that the indexable cutting insert can also be pulled back into a seat having non-round or several (flat) side contact surfaces. In contrast, the internal turning mechanisms of the prior art, which are inherently of relatively smaller size require a very precise manufacturing for a correct indexing of a multi-sided (e.g. polygonal shaped) indexable cutting insert. Hence, even small imperfections in the manufacturing of the prior art turning mechanism will cause angular deviations from the correct angular index position so that the multi-sided (e.g. polygonal shaped) indexable cutting insert cannot be retracted back into the seat with the correspondingly shaped side contact surfaces. The external indexing device and the milling tool of the present invention on the other hand enables a precise and reliable indexing of the multi-sided (e.g. polygonal shaped) indexable cutting insert.

The internal indexing mechanism in the milling tool of the present invention is actuated by the central punch of the external indexing device, which pushes the second end of the shaft member of the internal indexing mechanism when the milling tool and the external indexing device are brought coaxially together. The multi-sided indexable cutting insert is displaced to the outer indexing position, wherein the surrounding disc member with the annular geometry engages one of the sides on the multi-sided indexable cutting insert and, when a further relative movement is provided between the milling tool and the disc member, the annular geometry of the disc member turns the multi-sided indexable cutting insert around the insert centre axis toward the next index position. The further relative movement between the milling tool and the disc member of the external indexing device may be a relative rotational movement or a further relative coaxial/rectilinear movement, which causes the multi-sided indexable cutting insert to turn around the insert centre axis. The milling tool and the external indexing device are thereafter brought coaxially apart, whereby the central punch disengages the second end of the shaft member so that the cutting insert is retracted back into the seat by the compressible force generator (e.g. spring) forcing the shaft member of the internal indexing mechanism in the milling tool toward the inner supported position.

In an embodiment of the external indexing device, the annular geometry of the disc member comprises a sawtooth shape having a front surface and a back surface, wherein the front surface is arranged to engage one of the sides on a tangentially mounted and multi-sided indexable cutting insert in the outer indexing position and, when a relative rotational movement is provided between the milling tool and the disc member, to turn the tangentially mounted and multi-sided indexable cutting insert around the insert centre axis toward the next index position, wherein the back surface is extending along a ramp angle in relation to an upper reference plane of the disc member and is defining the next index position of the tangentially mounted and multi-sided indexable cutting insert. The sawtooth shape of the annular geometry is configured for a tangentially mounted indexable cutting insert having axial and tangential side contact surfaces in the seat of the milling tool. The indexing is performed when the tangential cutting insert has been completely pushed out of the seat where the tangentially mounted cutting insert is free to turn. The ramp angle on the back surface of the sawtooth shaped annular geometry determines the next angular/index position of the tangential cutting insert after it has been turned around the insert centre axis. A sufficient precision is easily achieved in the indexing operation, since it primarily depends on providing the correct ramp angle on the back surface on the sawtooth shape, so that the sides (support surfaces) of the tangential cutting insert are aligned with the axial and tangential contact surfaces of the seat. The milling tool and the external indexing device are thereafter brought coaxially apart, whereby the central punch disengages the second end of the shaft member so that the tangentially mounted and multi-sided indexable cutting insert is pulled back into the seat by the compressible force generator (e.g. spring) forcing the shaft member in the internal indexing mechanism of the milling tool toward the inner supported position.

In another embodiment of the external indexing device, the annular geometry is a peripheral edge of the disc member, wherein the peripheral edge is arranged to engage one of the sides on a radially mounted and multi-sided indexable cutting insert in the outer indexing and, when a further relative coaxial and rectilinear movement is provided between the milling tool and the central punch of the external indexing device that pushes the radially mounted and multi-sided indexable cutting insert further out of the seat, to support the side as the radially mounted and multi-sided indexable cutting insert turns around the insert centre axis toward the next index position. Hence, the peripheral edge of the disc member allows the radially mounted indexable cutting insert to tilt in the outer indexing position while a side of the radially mounted and multi-sided (polygonal shaped) indexable cutting insert is supported by the peripheral edge. The peripheral edge may be a bevelled edge forming a suitable bevel angle with an upper reference plane of the peripheral edge. The peripheral edge may also be a normal edge (non-bevelled) forming a perpendicular angle with the upper reference plane, or it may be a rounded edge on the disc member. The peripheral edge is configured for a milling tool equipped with a radially mounted indexable cutting insert having axial and radial contact surfaces in the seat of the milling tool. The axial and radial contact surfaces in the seat can guide or adjust the indexable cutting insert into the correct index/angular position as the cutting insert can turn in both directions around its centre axis also while it's being pulled back into the seat. In other words, it is not necessary that the sides (support surfaces) of the radially mounted cutting insert and the axial/radial contact surfaces of the seat are perfectly aligned after the radially mounted indexable cutting insert has been turned in the outer indexing position. Instead it is sufficient to push the radially mounted indexable cutting insert a distance outwards into the outer indexing position so that the axial side support surface is completely out of contact with the axial contact surface of the seat, whereby the cutting insert will pivot/tilt around the peripheral edge of the disc member and a new side (support surface) of the radially mounted indexable cutting insert is facing the axial contact surface of the seat. Thus, the peripheral edge supports the (lowermost) side surface of the radially mounted cutting insert, while allowing it to turn around its insert centre axis in the outer indexing position as the radially mounted cutting insert is pushed further out of the seat. The milling tool and the external indexing device are thereafter brought coaxially apart, whereby the central punch disengages the second end of the shaft member so that the radially mounted cutting insert is pulled back into the seat by the compressible force generator or spring biased shaft member of the internal indexing mechanism in the milling tool. The axial and radial contact surfaces of the milling tool will thereafter guide the radially mounted cutting insert into the correct angular position while it slides back into the inner supported position.

In an embodiment of the external indexing device, the disc member is elastically supported around the central punch, in such a way that the annular geometry of the disc member is elastically and axially forced against the indexable cutting inserts in the outer indexing position. Accordingly, a bottom side of the disc member may be supported by an elastic member, preferably by a spring such as a coil spring or more preferably a wave spring, arranged around the central punch, wherein the disc member including the annular geometry exhibits an elastic axial yield in the support of the indexable cutting insert in a short range of the motion both toward and away from the disc member during the indexing operation. This embodiment safeguards a continuous support of the indexable cutting insert by the annular geometry shortly before the turning movement is initiated as well as shortly after the indexable cutting insert has been turned into the next index position, whereby the cutting insert is in continuous support or contact with the annular geometry during the indexing operation. This embodiment can also improve the service life of the external indexing device, since the annular geometry on the disc member will not wear out as quickly as an axially rigid annular geometry.

In an embodiment of the external indexing device, the central punch has a conical envelope surface arranged for pushing the second end of the shaft member of the internal indexing mechanism successively more outwards, between the inner supported position and the outer indexing position, as the milling tool and the external indexing device are brought coaxially together. Hence, the conical envelope surface is configured with an axial extension along the central punch so that it at least covers the full range of motion for pushing the indexable cutting insert from the inner supported position to the outer indexing position. In this way, when the milling tool and the external indexing device are brought coaxially together, the embodiment can ensure that the indexable cutting insert is pushed out in a successive/controlled manner to the outer indexing position and not too abruptly. The conical envelope surface may extend axially so that its maximum diameter is situated (slightly) above an upper reference plane of the annular geometry of the disc member, wherein the disc member can be arranged (mounted) around a remaining cylindrical axial extension of the central punch. The conical envelope surface is preferably configured with an apex angle so that the outer indexing position of the indexable cutting insert coincides with the annular geometry of the disc member. The cutting insert is in this way prevented from reaching the outer (unsupported) indexing position too early and it reduces the risk of unintentional turning of the indexable cutting insert before the annular geometry of the disc member provides support to a side support surface of the indexable cutting insert.

In a third aspect, the primary object is achieved by an indexing system comprising the milling tool and the external indexing device of the invention. The indexing system also enables a reliable indexing operation to be performed automatically by a milling machine without taking the milling tool out of operation. The internal indexing mechanism is actuated by the milling machine bringing the milling tool into engagement with the external indexing device. The indexing system of the present invention may be provided inside the milling machine, whereby the milling machine can perform an automatic (programmed) indexing operation of the indexable cutting inserts at predetermined intervals. The predetermined intervals may correspond to a period of machining that equals the service life of the active cutting edges on the indexable cutting inserts. The machining economy and capacity is increased by the indexing system of the present invention and the milling machine can be left unattended for a longer time. This can also reduce work-related injuries for the operators, since it alleviates the operator from the manual work associated with dismounting/mounting of both the milling tool and the indexable cutting inserts.

Further details and advantages of the invention will appear from the following detailed description.

BRIEF DESCRIPTION OF THE DRAWINGS

Embodiments are described with references to the drawings, in which.

DETAILED DESCRIPTION OF EMBODIMENTS OF THE INVENTION

Figure 1A:
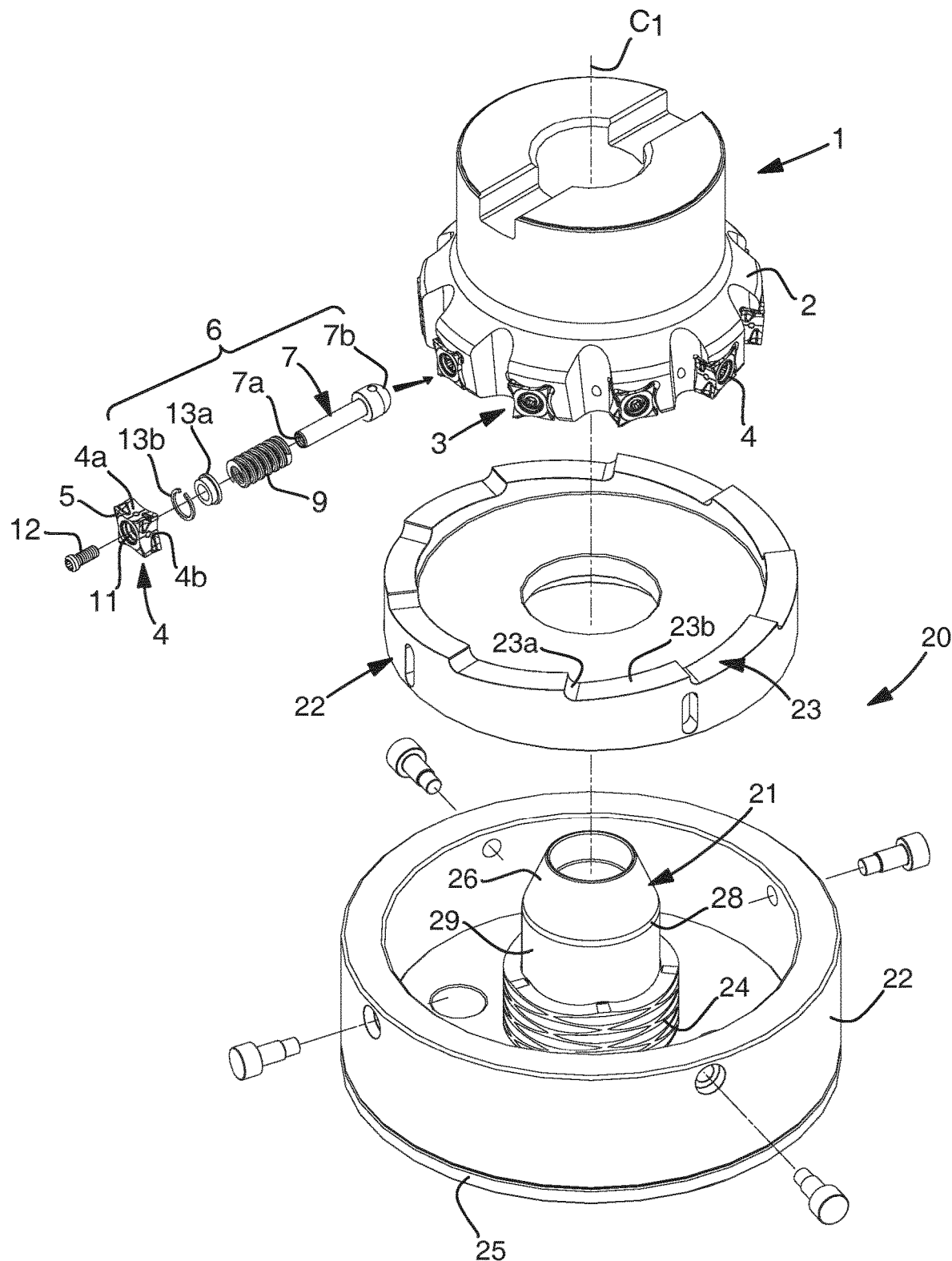
FIG. 1*a-b* show perspective views of a milling tool and an external indexing device in a first embodiment of the invention.

A milling tool 1 for chip-removing machining in a first embodiment of the invention is shown in FIGS. 1-4. The milling tool 1 of the first embodiment is a face and/or shoulder milling tool comprising a tool body 2, which is rotatable around a central rotation axis $C_1$. The tool body 2 comprises a plurality of insert seats 3, wherein each seat 3 comprises an axial side contact surface 3a and a tangential side contact surface 3b. The face and/or shoulder milling tool 1 comprises a plurality of indexable cutting inserts 4 arranged in the seats 3. The indexable cutting insert 4 is a tangentially mounted indexable cutting insert 4, which is supported by the axial and tangential support surfaces 3a, 3b in the seat 3. The tangentially mounted indexable cutting insert 4 comprises an insert centre axis $C_2$ around which the indexable cutting insert 4 has a rotational symmetry. The tangentially mounted indexable cutting insert 4 has a multi-sided shape as seen in the direction of the insert centre axis $C_2$ and identical side support surfaces 4a, 4b are included in the sides of the multi-sided indexable cutting insert 4. More precisely, the multi-sided indexable cutting insert is approximately square shaped having four identical and concave side support surfaces 4a, 4b. The tangentially mounted indexable cutting insert is a double-sided cutting insert having (four) identical and indexable cutting edges 5 arranged along a top side as well as a bottom side of the cutting insert 4. Two of the identical side support surfaces 4a, 4b situated around the insert centre axis $C_2$ are arranged to be supported by the axial and tangential side contact surfaces 3a, 3b of the insert seat 3.

The face and/or shoulder milling tool 1 of the first embodiment comprises an internal indexing mechanisms 6 configured to displace the tangentially mounted indexable cutting insert 4 between an inner supported position S (see FIG. 3a), wherein the two side support surfaces 4a, 4b are supported by the axial and tangential side contact surfaces 3a, 3b, and an outer indexing position I (see FIGS. 3b and 3d), wherein the two side support surfaces 4a, 4b are completely out of contact with the axial and tangential side contact surfaces 3a, 3b. The internal indexing mechanism 6 comprises a shaft member 7 with a shaft centre axis $C_3$ extending inside a bore 8 formed in the tool body 2. The indexable cutting insert 4 is connected at a first end 7a of the shaft member 7. A second end 7b of the shaft member 7 is arranged for pushing the shaft member 7 with the indexable cutting insert 4 to the outer indexing position I. The shaft member 7 is forced toward the inner supported position S by a compressible force generator in the form of a spring 9. The internal indexing mechanism 6 is arranged to provide a rectilinear movement L along the shaft centre axis $C_3$, between the inner supported position S and the outer indexing position I, wherein the indexable cutting insert 4 is free to turn in both directions around the insert centre axis $C_2$ in the outer indexing position I.

The shaft member 7 is arranged inside the bore 8 and extend in a radial direction of the tool body 2, wherein the second end 7b for pushing the shaft member 7 is projecting from the bore 8 into a central cavity 10, which is formed in a front end 2a of the tool body 2 and extends coaxially with the central rotation axis $C_1$ of the tool body 2. As can be seen, in for instance FIG. 4, the milling tool 1 comprises a plurality of internal indexing mechanisms 6, each connected to an individual indexable cutting insert 4 at the first end 7a of the shaft member 7, wherein the second ends 7b of the shaft members 7 are projecting into the central cavity 10 provided in the front end 2a of the tool body 2.

The tangentially mounted indexable cutting insert 4 is fixedly mounted to the first end 7a of the shaft member 7 with the insert centre axis $C_2$ arranged coaxially with the shaft centre axis $C_3$, wherein the tangentially mounted indexable cutting insert 4 is free to turn in both directions around the insert centre axis $C_2$ in the outer indexing position I by the shaft member 7 being rotatably supported inside the bore 8 around the shaft centre axis $C_3$. The tangentially mounted indexable cutting insert 4 comprises a central through-hole 11 arranged coaxially with the insert centre axis $C_2$, wherein the first end 7a of the shaft member 7 comprises an internally threaded hole 7c extending coaxially with the shaft centre axis $C_3$. The tangentially mounted indexable cutting insert 4 is thereby directly connected to the first end 7a of the shaft member 7 with an insert screw 12 mounted in the through-hole 11 and into the internally threaded hole 7c of the shaft member 7.

As mentioned above the shaft member 7 is forced or spring biased toward the inner supported position S by a compressible force generator in the form of a spring 9. The spring 9 is arranged between a first stationary shoulder 13—in the form of a spring washer 13a held in place by a retaining ring 13b mounted in an annular groove in the bore 8—and a second moveable shoulder 14 provided by a shaft head 15 formed at the second end 7b of the shaft member 7. As the shaft member 7 with the indexable cutting insert 4 is pushed toward the outer indexing position I, the spring 9 is compressed between the first stationary shoulder 13 and the second moveable shoulder 14, whereby the shaft member 7 and the indexable cutting insert 4 becomes spring biased or forced in a direction towards the inner supported position S. The shaft head 15 comprises a rounded (hemispherical) end surface 16 forming the second end 7b of the shaft member 7 for gentle engagement when pushing it toward the outer indexing position I. The shaft head 15 further comprises a cylindrical portion 17, which is arranged inside the bore 8 and is extending coaxially with the shaft centre axis $C_3$ to moveably support the shaft member's 7 rectilinear movement L inside the bore 8 along the shaft centre axis $C_3$. The cylindrical portion 17 of the shaft head 15 is circular cylindrical and the bore 8 is also circular cylindrical so that the cylindrical portion 17 of the shaft head 15 is rotatably supporting the shaft member 7 inside the bore 8 around the shaft centre axis $C_3$. Furthermore, the spring washer 13a of the stationary shoulder 13 is configured as a bushing for rotatably supporting the shaft member 7 around the shaft centre axis $C_3$ inside the bore 8. Accordingly, the shaft member 7 and the tangential mounted indexable cutting insert 4 is supported both in the rectilinear movement L along the shaft centre axis $C_3$ as well as in the turning movement $R_1$ around the shaft centre axis $C_3$.

Figure 1B:
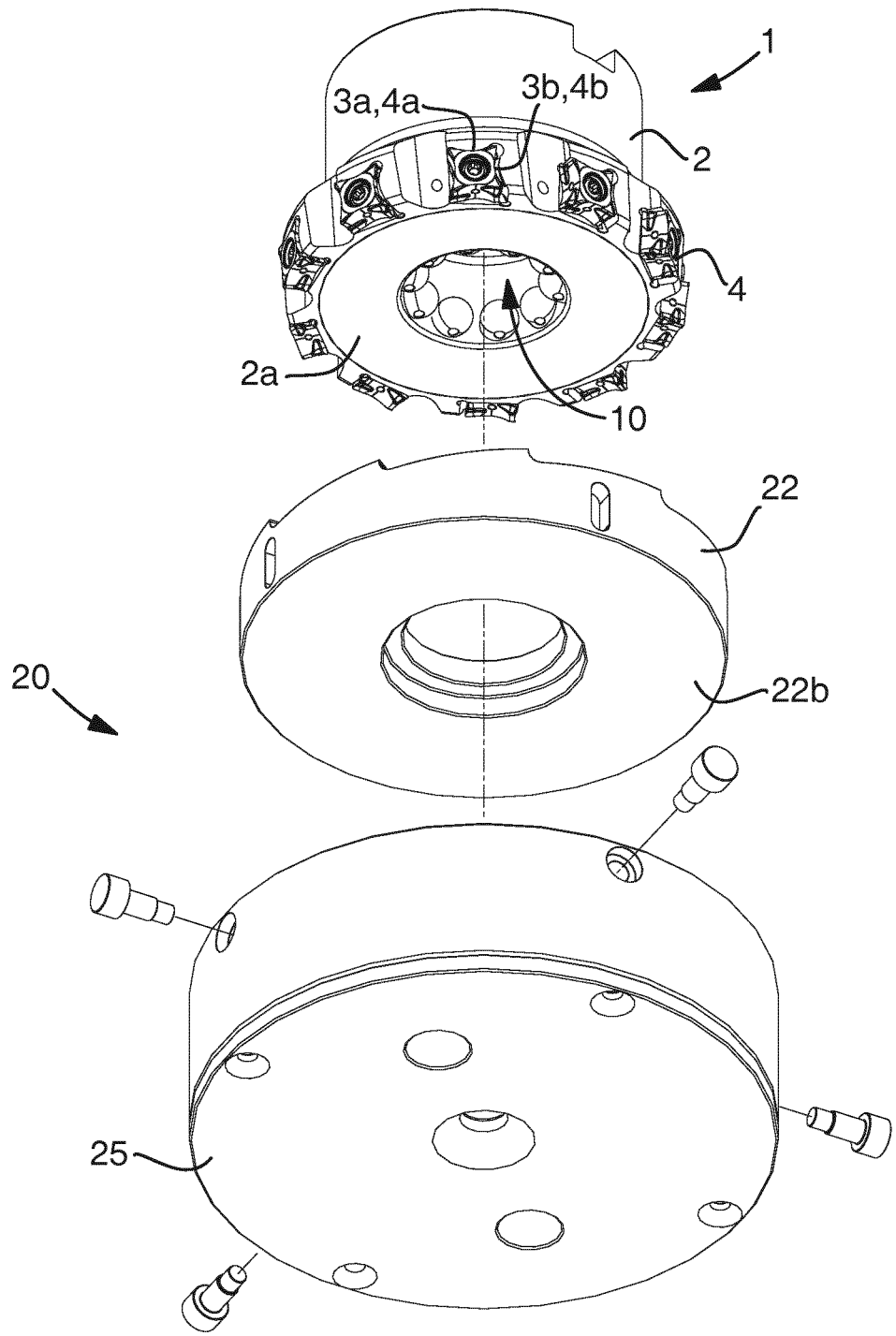
Figure 2A:
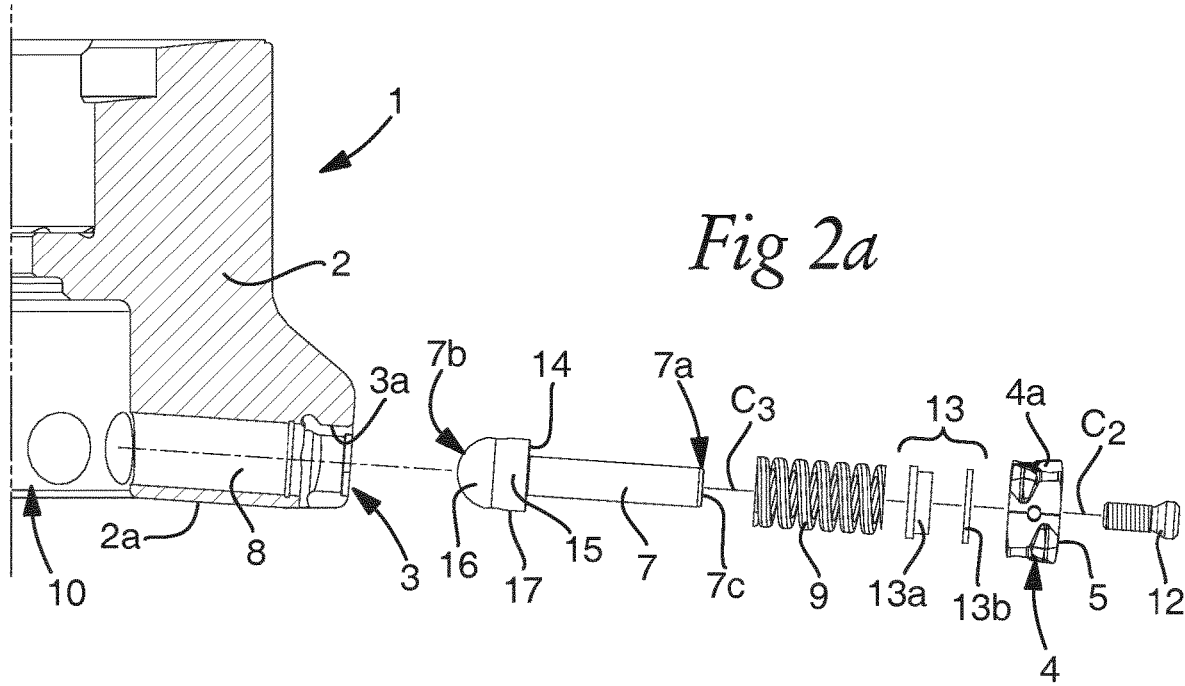
FIG. 2*a-b* show longitudinal sections of the milling tool including an internal indexing mechanism in accordance with the first embodiment.
Figure 2B:
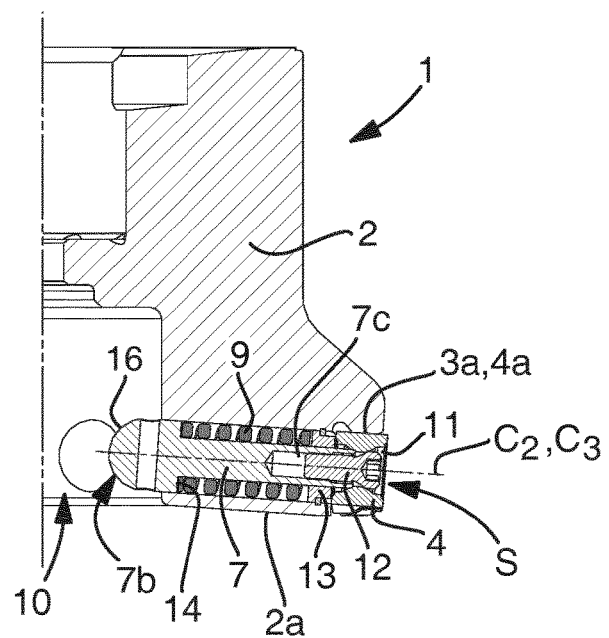

An external indexing device 20 for the shoulder and/or face milling tool 1 of the first embodiment is furthermore shown in FIGS. 1 and 3. The external indexing device 20 comprises a central punch 21, which is protruding from a disc member 22 arranged concentric with the central punch 21. The central punch 21 is arranged for pushing the second end 7b of the shaft member 7 of the internal indexing mechanism 6 so that the indexable cutting insert 4 is displaced to the outer indexing position I. The surrounding disc member 22 is configured with an annular geometry 23 arranged to engage one of the sides 4a, 4b on the multi-sided (approximately square shaped) indexable cutting insert 4 and, when a further relative movement is provided between the milling tool 1 and disc member 22, to turn the indexable cutting insert 4 around the insert centre axis $C_2$ toward the next index position (see FIGS. 3c and 3d). In the first embodiment the annular geometry of the disc member 22 comprises a sawtooth shape 23 having a front surface 23a and a back surface 23b, wherein the front surface 23a is arranged to engage a side 4a, 4b (serving as a rake surface) or rather the active cutting edge on the tangentially mounted indexable cutting insert 4 in the outer indexing position I and, when a further relative rotational movement $R_2$ is provided between the milling tool 1 and the disc member 22, to thereby turn the tangentially mounted indexable cutting insert 4 into the next index position. The back surface 23b is extending along a ramp angle β in relation to an upper reference plane $P_U$ of the disc member 22 and is defining the index position of the tangentially mounted indexable cutting insert 4. In other words, the ramp angle β on the back surface 23b is configured so that the side support surfaces 4a, 4b of the tangential cutting insert 4 are aligned with the axial and tangential contact surfaces 3a, 3b of the seat 3.

The disc member 22 of the external indexing device is elastically arranged relative to the central punch 21, such that, when the indexable cutting insert 4 is in the outer indexing position I, the back surface 23b of the sawtooth shape 23 is elastically and axially forced against the (lowermost) side support surface 4a, 4b of the indexable cutting insert 4. A bottom side 22b of the disc member 22 is thereby supported by an elastic member in the form of a wave spring 24, arranged around the central punch 21, wherein the disc member 22 including the sawtooth shaped annular geometry 23 exhibits an elastic axial yield in the support of the indexable cutting insert 4 in a short range of motion both toward and away from the disc member 22 during the indexing operation. This provides a continuous support of the lowermost side support surface 4b of the indexable cutting insert by the back surface 23b shortly before the relative rotational movement $R_2$ is initiated as well as shortly after the indexable cutting insert 4 has been turned and the milling tool 1 and external indexing device 20 are brought coaxially apart. The elastic axial yield can also improve the service life of the sawtooth shaped annular geometry 23 and/or the indexable cutting insert 4 compared to an axially rigid annular geometry. As can be seen the wave spring 24 is arranged between the bottom side 22b of the disc member 22 and a base plate 25 configured for mounting the external indexing device 20.

The central punch 21 of the first embodiment comprises a conical envelope surface 26 configured with an extension 27 in the axial direction and an apex angle α along the central punch 21 for pushing the indexable cutting insert 4 successively more outwards, from the inner supported position S all the way to the outer indexing position I, as the milling tool 1 and the external indexing device 20 are brought coaxially together. The apex angle α is preferably designed with the smallest possible angle to achieve a more favourable engagement angle between the central punch 21 and the second end 7b of the shaft member 7. A limiting factor for the apex angle α is however the maximum available extension on the central punch 21 and the available axial extension on the central cavity 10 at the front end 2a of the tool body 2, since a smaller apex angle α requires longer central punches 21/central cavities 10 to push the shaft members 7 and indexable cutting inserts 4 sufficiently far out. A sufficient distance that a normal sized indexable cutting insert 4 is required to be pushed out of the seat is in a range of 5 mm-10 mm. Hence, the axial extension 27 on the conical envelope surface 26 and the apex angle α can hereby be adapted to provide this distance for pushing the indexable cutting insert 4 to the outer indexing position I. The extension 27 in the axial direction ends at a maximum diameter 28 situated approximately in level with (or slightly above) the upper reference plane $P_U$ of the sawtooth shaped annular geometry 23 of the disc member 22 (see FIGS. 3a and 3d). Accordingly, the tangentially mounted indexable cutting insert 4 reaches the outer indexing position I approximately simultaneously (or slightly above) the back surface 23b that provides support to the (lowermost) side support surface 4a, 4b of the tangentially mounted indexable cutting insert 4 (FIG. 3b). The milling tool 1 may be brought a further (short) distance coaxially along a cylindrical axial extension 29 of the central punch 21, wherein the back surface 23b is supporting the lowermost side support surface due to the elastic axial yield of the disc member 22 (FIG. 3c), wherein the disc member 22 is arranged (mounted) around the remaining cylindrical axial extension 29 of the central punch 21 and the wave spring 24 is supporting the bottom side 22b of the disc member 22.

Figure 3A:
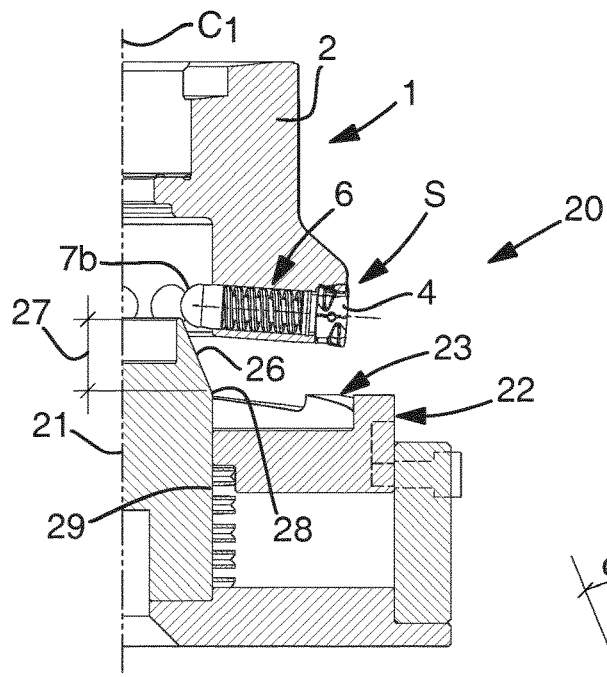
FIG. 3*a-e* show a sequence of an indexing operation in the first embodiment.
Figure 3B:
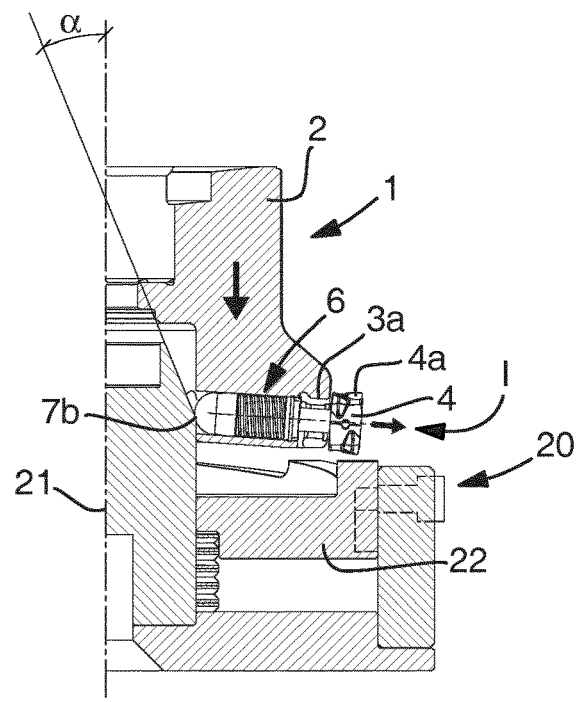
Figure 3C:
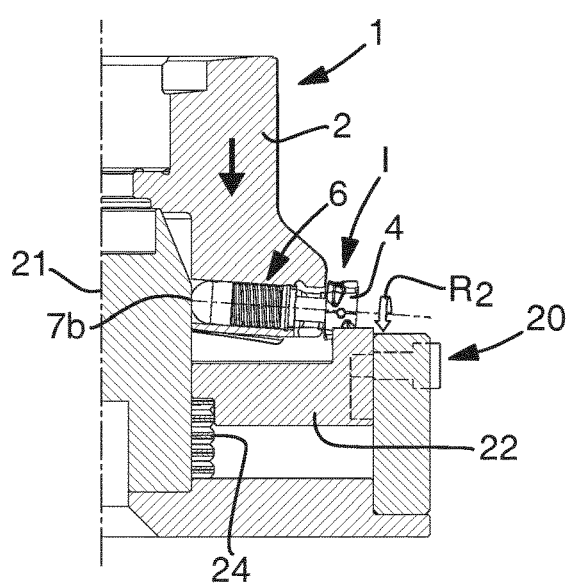
Figure 3D:
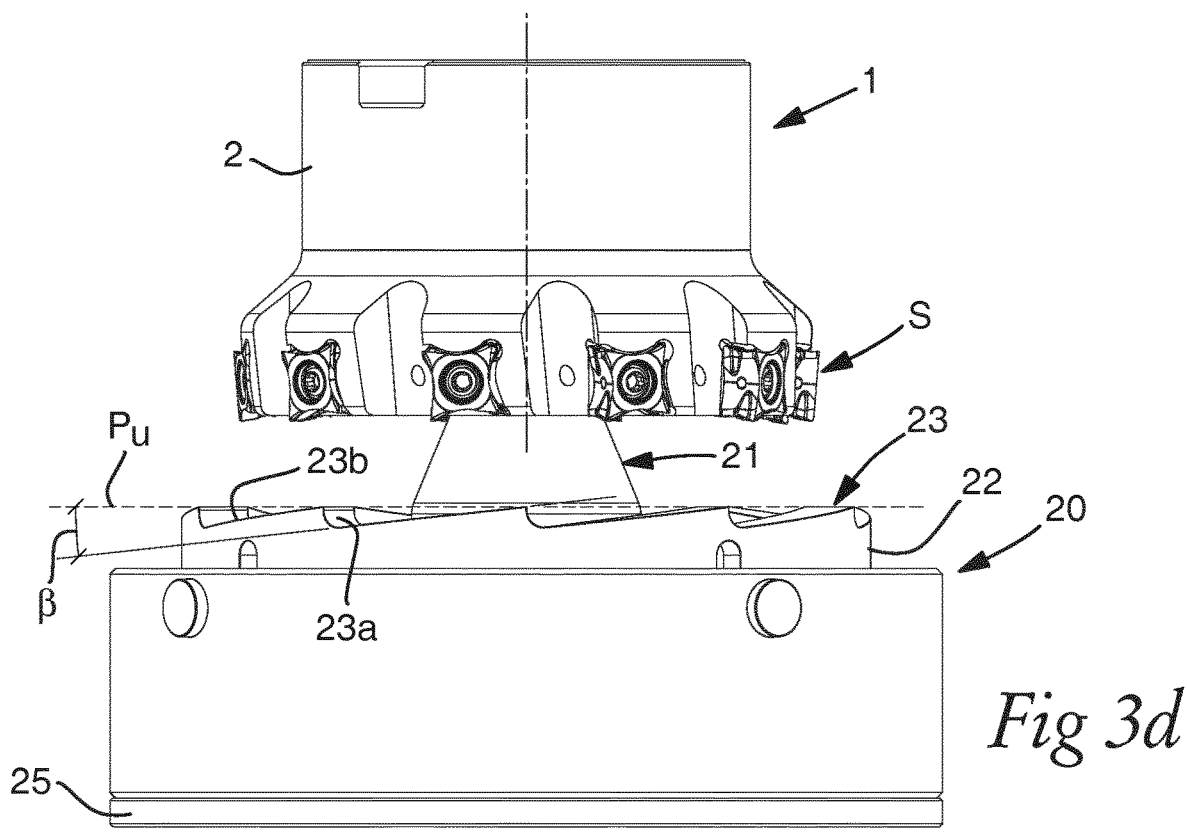
Figure 3E:
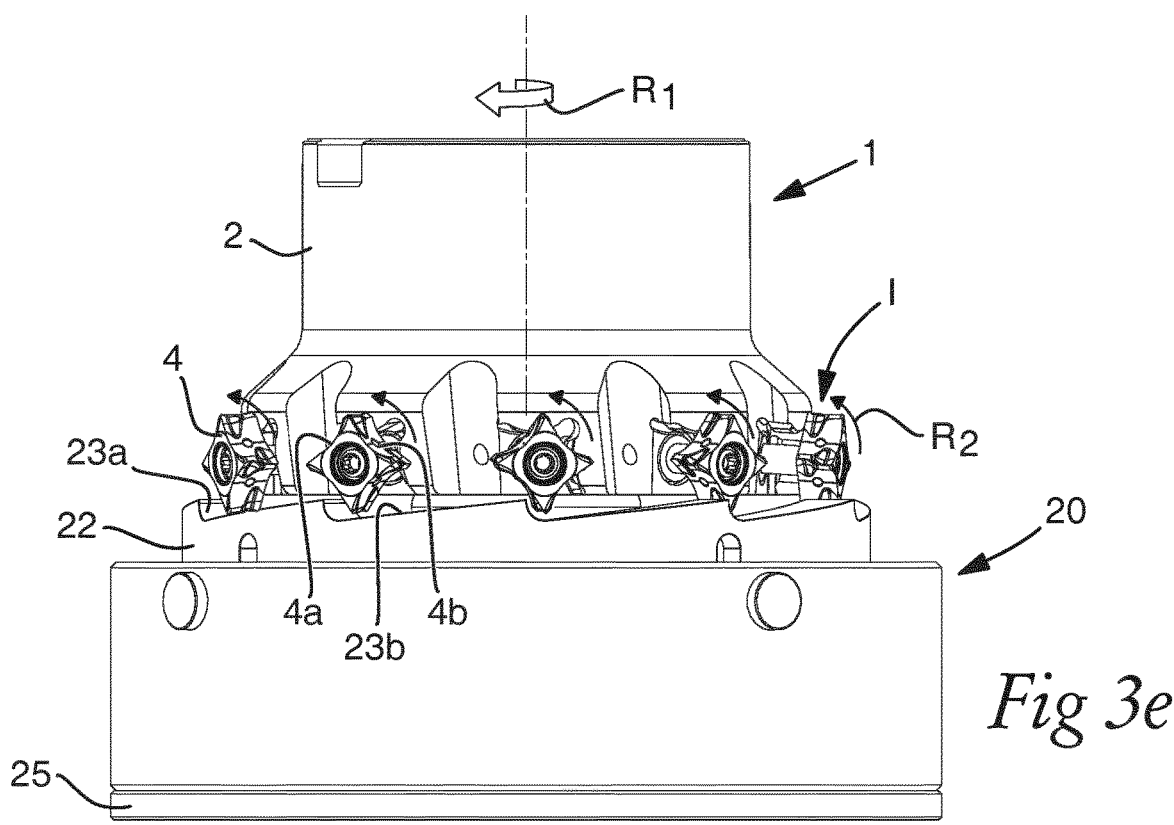
Figure 4:
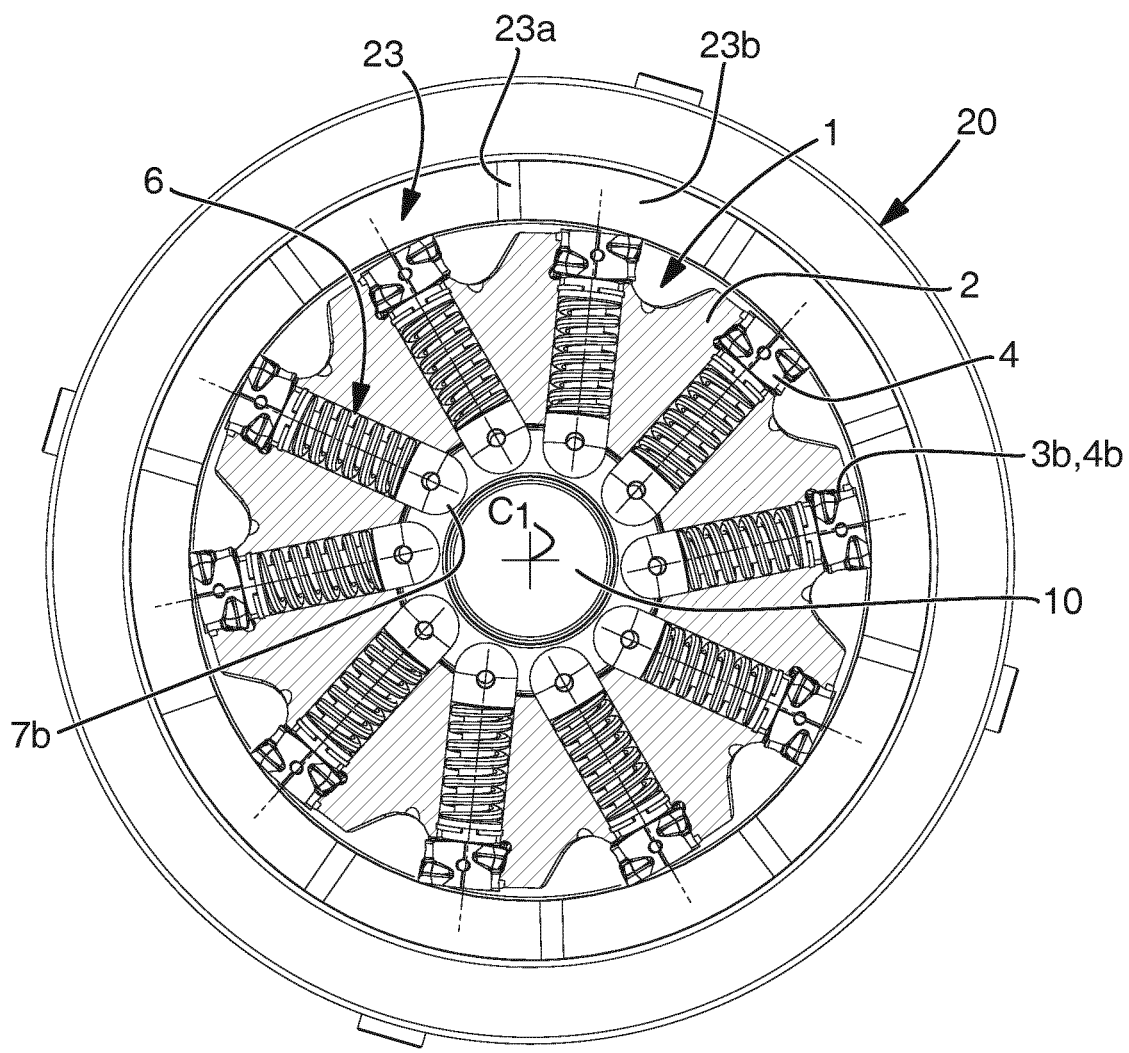
FIG. 4 shows a cross-section of the milling tool in the first embodiment.

The indexing operation is shown in FIGS. 3a-3e. The milling tool 1 and the external indexing device are initially brought coaxially together as shown in FIGS. 3a and 3d, wherein the tangentially mounted indexable cutting insert 4 is pushed outwards to the outer indexing position I so that the axial and tangential side support surfaces 4a, 4b are completely out of contact with the axial and tangential contact surfaces 3a, 3b of the seat 3 (see FIG. 3b). The indexing is performed when the tangential cutting insert 4 has been completely pushed out of the seat 3 where the tangentially mounted cutting insert 4 is free to turn (see FIGS. 3c and 3e). The back surface 23b of the sawtooth shape supports the (lowermost) side support surface 4a, 4b of the tangentially mounted cutting insert 4, while allowing it to turn around its insert centre axis $C_2$, in the outer indexing position I, both prior to the further relative rotational movement $R_2$ is initiated as well as after the tangential mounted indexable cutting insert 4 has been turned to the next index position. The cutting insert 4 is turned by the front surface 23a of the sawtooth shaped annular geometry 23, wherein new side support surfaces 4a, 4b of the tangentially mounted indexable cutting insert 4 are aligned with the axial and tangential contact surfaces 3a, 3b of the seat 3 by means of the back surface 23b. The milling tool 1 and the external indexing device 20 are thereafter brought coaxially apart, whereby the central punch 21 disengages the second end 7b of the shaft member 7 so that the tangentially mounted cutting insert 4 is pulled back into the seat 3 by the spring biased shaft member 7 of the internal indexing mechanism 6 in the milling tool 1.

FIGS. 5-8 show a milling tool 1' for chip-removing machining in a second embodiment of the invention. The milling tool 1' is a face milling tool comprising a tool body 2', which is rotatable around a central rotation axis $C_1$. The tool body 2' comprises a plurality of insert seats 3', wherein each seat 3' comprises an axial side contact surface 3a' and a radial side contact surface 3b'. A plurality of indexable cutting inserts 4' are arranged in the insert seats 3'. Each indexable cutting insert is a radially mounted indexable cutting insert 4', which is supported by the axial and radial support surfaces 3a', 3b' in each seat 3'. The radially mounted indexable cutting insert 4' comprises an insert centre axis $C_2$ around which the indexable cutting insert 4' has a rotational symmetry. The indexable cutting insert 4' has a multi-sided or polygonal shape as seen in the direction of the insert centre axis $C_2$ and identical side support surfaces 4a', 4b' are included in the sides of the polygonal shaped indexable cutting insert 4'. More precisely, the polygonal shaped indexable cutting insert is hexagonal having a corresponding number of six identical side support surfaces 4a', 4b'. Furthermore, the indexable cutting insert is a double-sided cutting insert having (six) identical and indexable cutting edges 5' arranged along a top side as well as a bottom side of the cutting insert 4'. Two of the identical side support surfaces 4a', 4b' situated around the insert centre axis $C_2$ are arranged to be supported by the axial and radial side contact surfaces 3a', 3b' in the insert seat 3'.

The face milling tool 1' comprises an internal indexing mechanism 6' configured to displace the radially mounted indexable cutting insert 4' between an inner supported position S' (see FIG. 7a), wherein the two side support surfaces 4a', 4b' are supported by the axial and radial side contact surfaces 3a', 3b', and an outer indexing position I' (see FIG. 7d), wherein the two side support surfaces 4a', 4b' are out of contact with the axial and radial side contact surfaces 3a', 3b'. The internal indexing mechanism 6' comprises a shaft member 7' with a shaft centre axis $C_3$ extending inside a bore 8' formed in the tool body 2'. The indexable cutting insert 4' is connected at a first end 7a' of the shaft member 7', wherein a second end 7b' of the shaft member 7' is arranged for pushing the shaft member 7' with the indexable cutting insert 4' to the outer indexing position I'. The shaft member 7' is forced/spring biased toward the inner supported position S' by a compressible force generator/spring 9'. The internal indexing mechanism 6' is arranged to provide a rectilinear movement L' along the shaft centre axis $C_3$, between the inner supported position S' and the outer indexing position I', wherein the indexable cutting insert 4' is free to turn in both directions around the insert centre axis $C_2$' in the outer indexing position I'.

The shaft member 7' inside the bore 8' extends in a radial direction of the tool body 2', wherein the second end 7b' for pushing the shaft member 7' is projecting from the bore 8' into a central cavity 10', which is formed in a front end 2a' of the tool body 2' and extends coaxially with the central rotation axis $C_1$' of the tool body 2'. As can be seen, in for instance FIG. 8, the face milling tool 1' comprises a plurality of internal indexing mechanisms 6', each connected to an individual indexable cutting insert 4' at the first end 7a' of the shaft member 7', wherein the second ends 7b' of the shaft members 7' are projecting into the central cavity 10' provided in the front end 2a' of the tool body 2'.

The radially mounted indexable cutting insert 4' in the second embodiment is connected to the first end 7a' of the shaft member 7' via an insert head 18'. The insert head 18' is mounted to the first end 7a' of the shaft member 7' with a screw 12'. The insert head 18' comprises a cylindrical insert axle 18a' extending transverse the shaft centre axis $C_3$' (see FIG. 5). The indexable cutting insert 4' comprises a central through-hole 11' extending coaxially with the insert centre axis $C_2$', wherein the cylindrical insert axle 18a' is arranged in the central through-hole 11' so that the radially mounted indexable cutting insert 4' is supported and free to turn around its centre axis $C_2$' on the cylindrical insert axle 18a' in the outer indexing position I'.

The insert head 18' further comprises a cylindrical main body portion 18b', which is extending coaxially with the shaft centre axis $C_3$' to moveably support the shaft member's 7' rectilinear movement L' along the shaft centre axis $C_3$' in the bore 8' of the tool body 2'.

As mentioned above, the shaft member 7' is forced toward the inner supported position S' by a compressible force generator in the form of a spring 9'. The spring 9' is arranged between a first stationary shoulder 13'—in the form of a washer 13a' held in place by a retaining ring 13b' mounted in an annular groove in the bore 8'—and a second moveable shoulder 14' on a shaft head 15' formed at the second end 7b' of the shaft member 7'. As the shaft member 7' with the indexable cutting insert 4' is pushed toward the outer indexing position I', the compressible force generator/spring 9' is compressed between the first stationary shoulder 13' and the second moveable shoulder 14', whereby the shaft member 7' and the indexable cutting insert 4' are forced (spring biased) toward the inner supported position S'. The shaft head 15 is formed with a rounded (hemispherical) end portion 16' at the second end 7b' of the shaft member 7' for gentle engagement when pushing it toward the outer indexing position I'. The shaft head 15' further comprises a cylindrical portion 17', which is arranged inside the bore 8' and is extending coaxially with the shaft centre axis $C_3$' to moveably support the shaft member's 7' rectilinear movement L' along the shaft centre axis $C_3$' in the bore 8 of the tool body 2'.

Figure 5A:
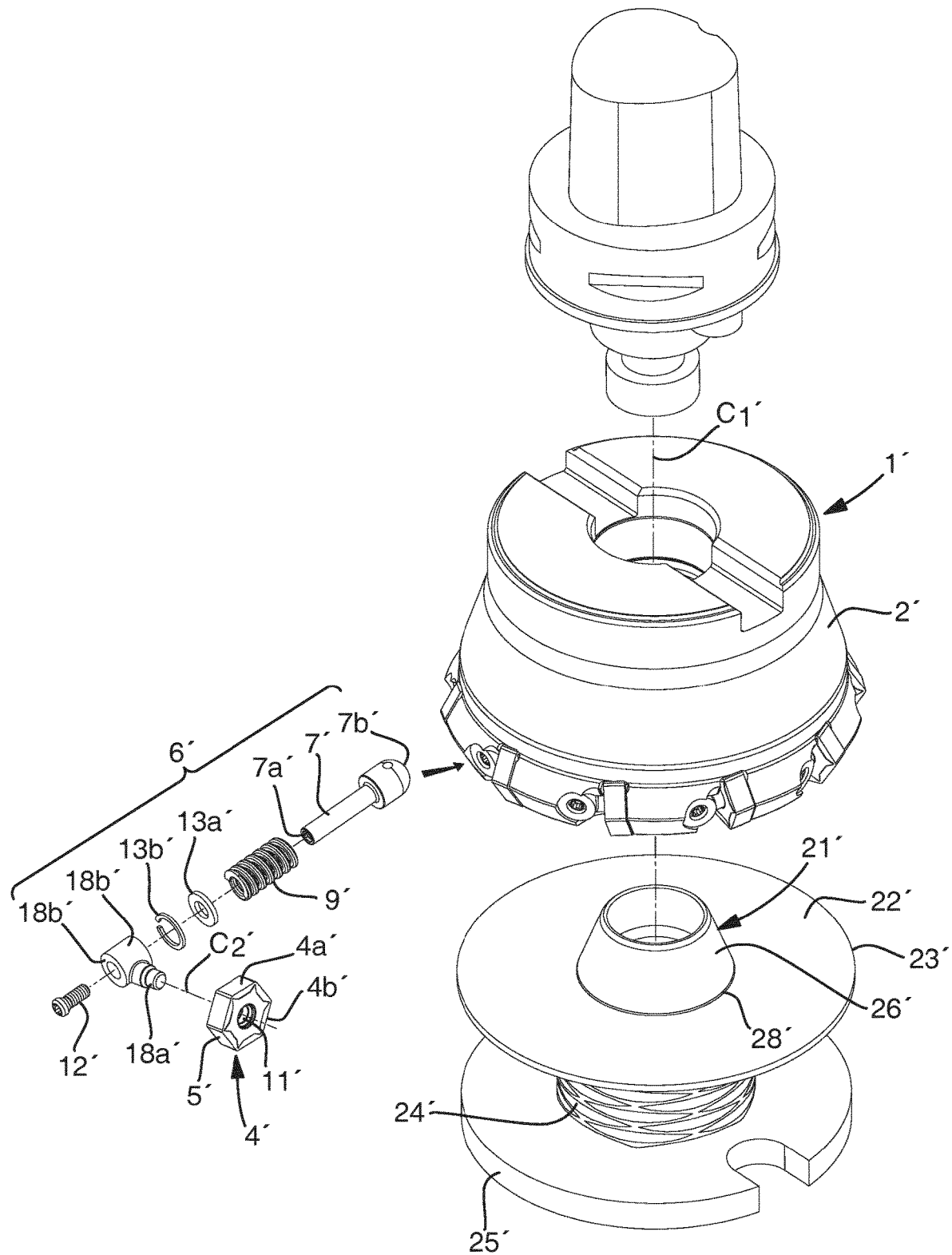
FIG. 5*a-b* show perspective view of a milling tool and an external indexing device in a second embodiment of the invention.
Figure 5B:
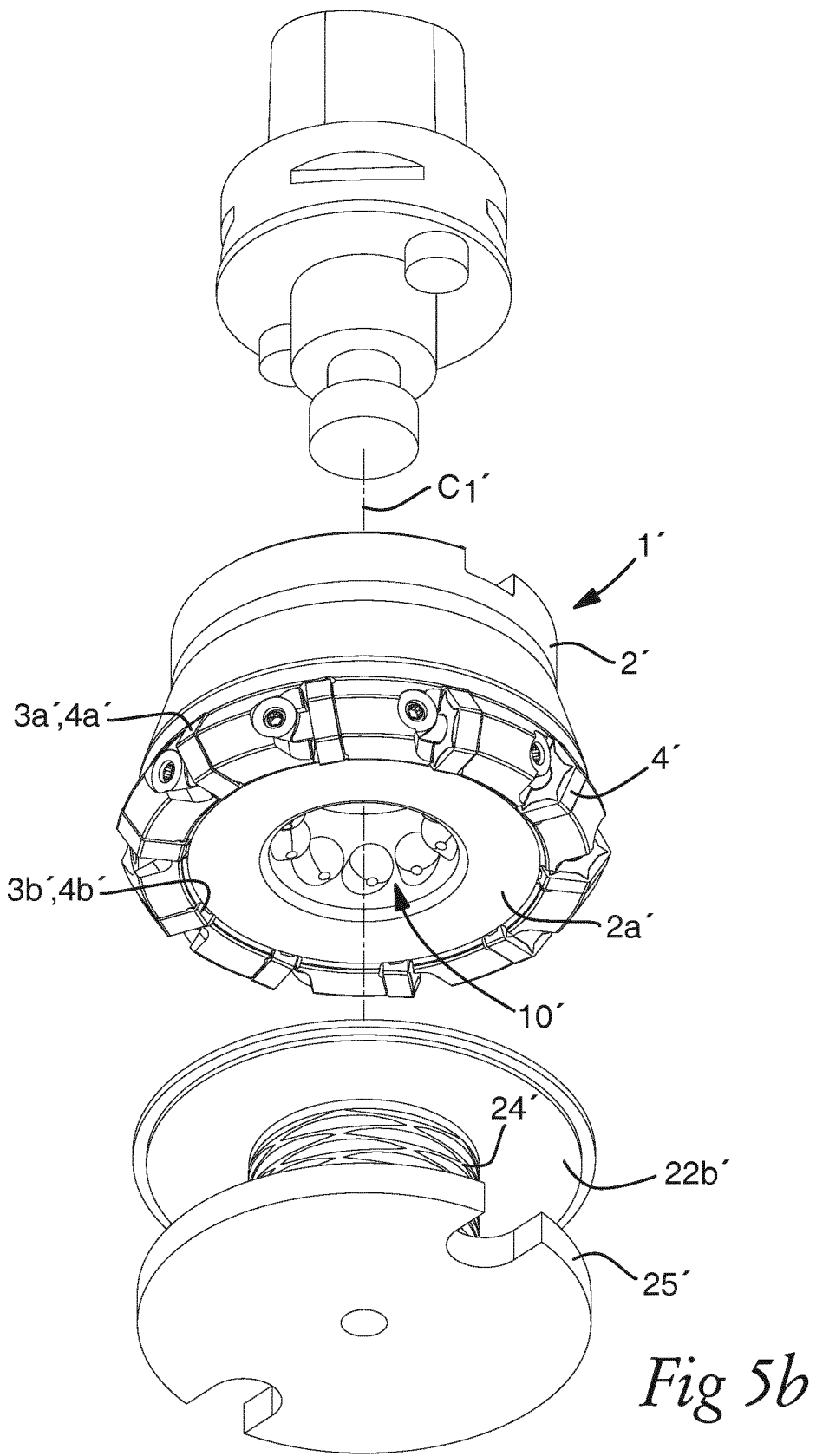
Figure 6A:
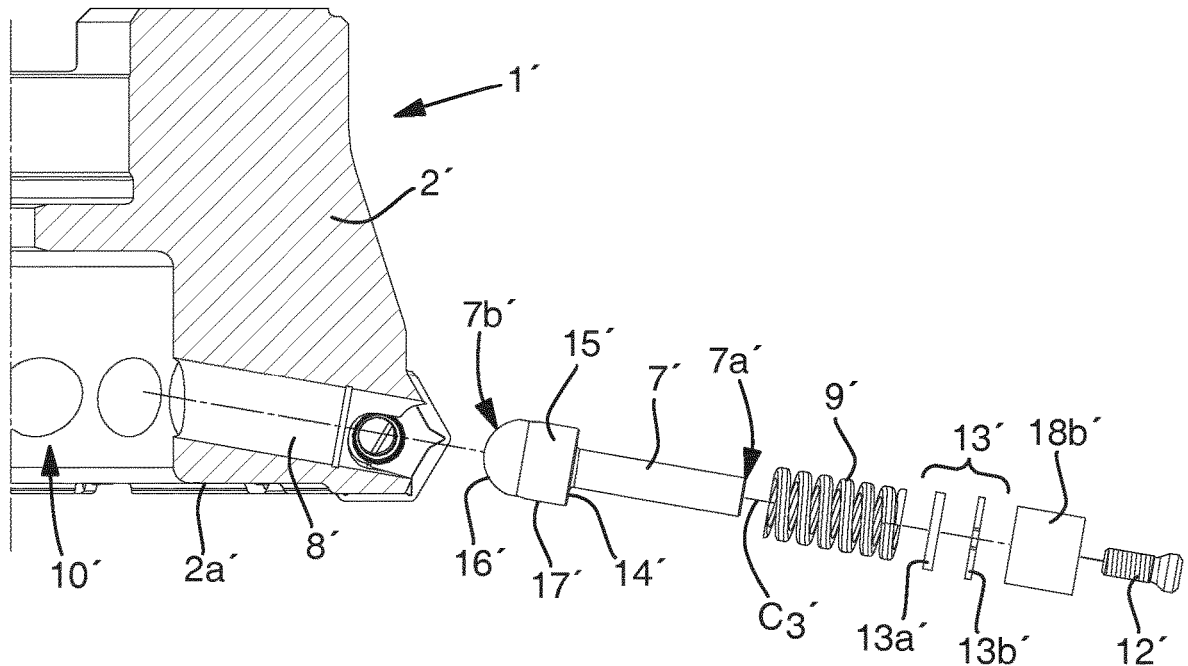
FIG. 6*a-b* show longitudinal sections of the milling tool including an internal indexing mechanism in accordance with the second embodiment.
Figure 6B:
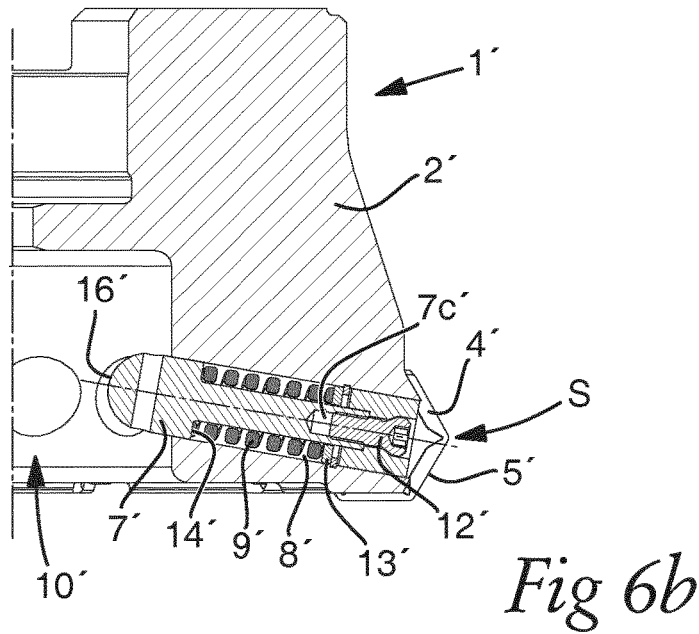

An external indexing device 20' for the milling tool 1' of the second embodiment is furthermore shown in FIGS. 5 and 7. The external indexing device 20' comprises a central punch 21', which is protruding from a disc member 22' arranged concentric with the central punch 21'. The central punch 21' is arranged for pushing the second end 7b' of the shaft member 7' of the internal indexing mechanism 6' so that the radially mounted indexable cutting insert 4' is displaced to the outer indexing position I'. The surrounding disc member 22' is configured with an annular geometry 23' arranged to engage one of the sides 4a', 4b' on the multi-sided/polygonal shaped indexable cutting insert 4' and, when a further relative movement is provided between the milling tool 1' and disc member 22', to turn the indexable cutting insert 4' around the insert centre axis $C_2$ toward the next index position (see FIGS. 7a-3f). In this second embodiment the annular geometry of the disc member 22' is a peripheral edge 23' arranged to engage a lower side (support surface) 4a', 4b' of the radially mounted indexable cutting insert 4' in the outer indexing position I' and, when a further relative coaxial and rectilinear movement is provided between the milling tool 1' and the central punch 21' of the external indexing device 20' that pushes the radially mounted cutting insert 4' further out of the seat 3', to support the side as the radially mounted indexable cutting insert 4' turns toward the next index position (see FIG. 7d). As can be seen in the cross-sectional views of FIGS. 7a-3f, the peripheral edge 23' is a normal edge forming a perpendicular angle with an upper reference plane $P_U$' of the peripheral edge 23'.

Figure 7A:
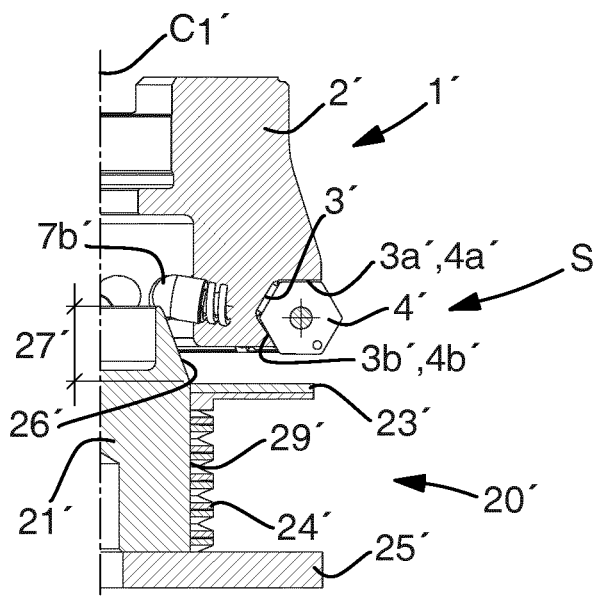
FIG. 7*a-f* show a sequence of an indexing operation in the second embodiment.
Figure 7B:
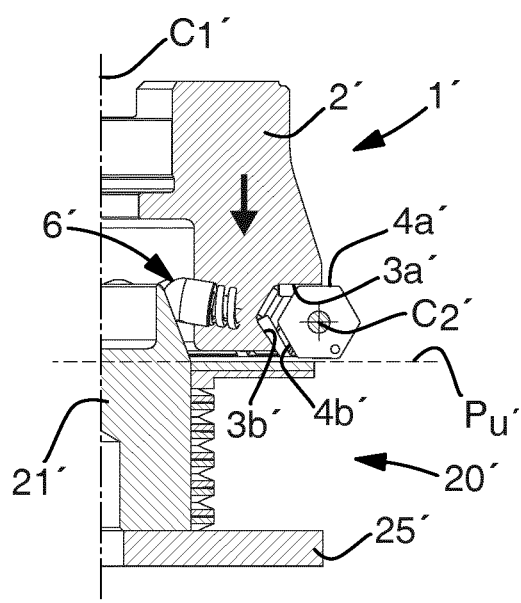
Figure 7C:
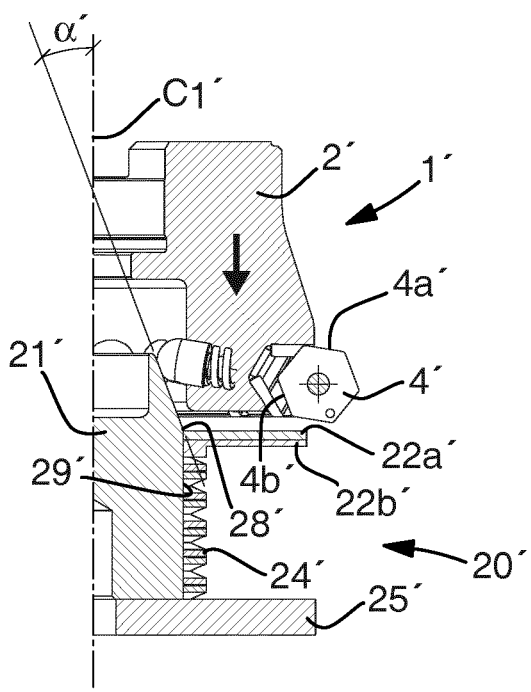
Figure 7D:
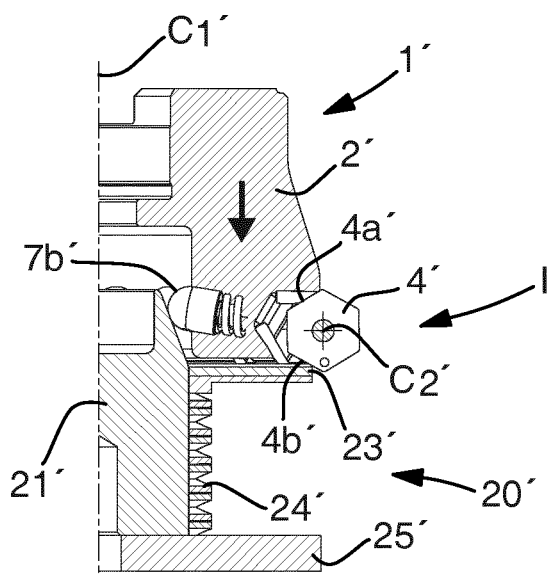
Figure 7E:
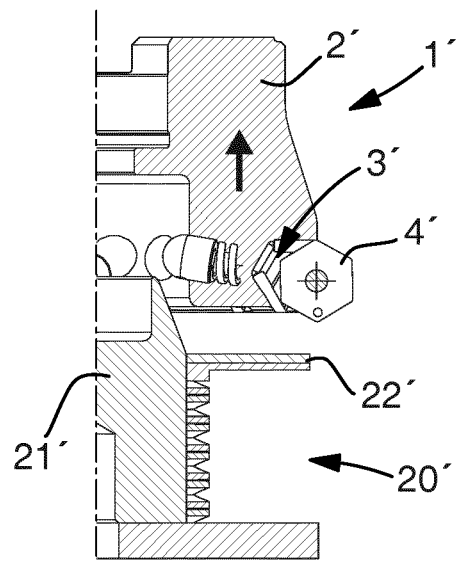
Figure 7F:
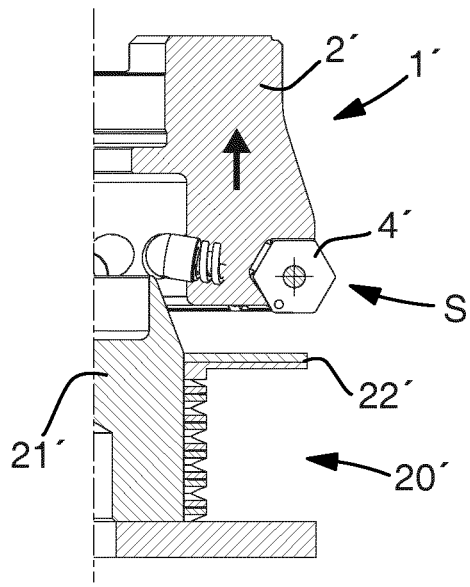
Figure 8:
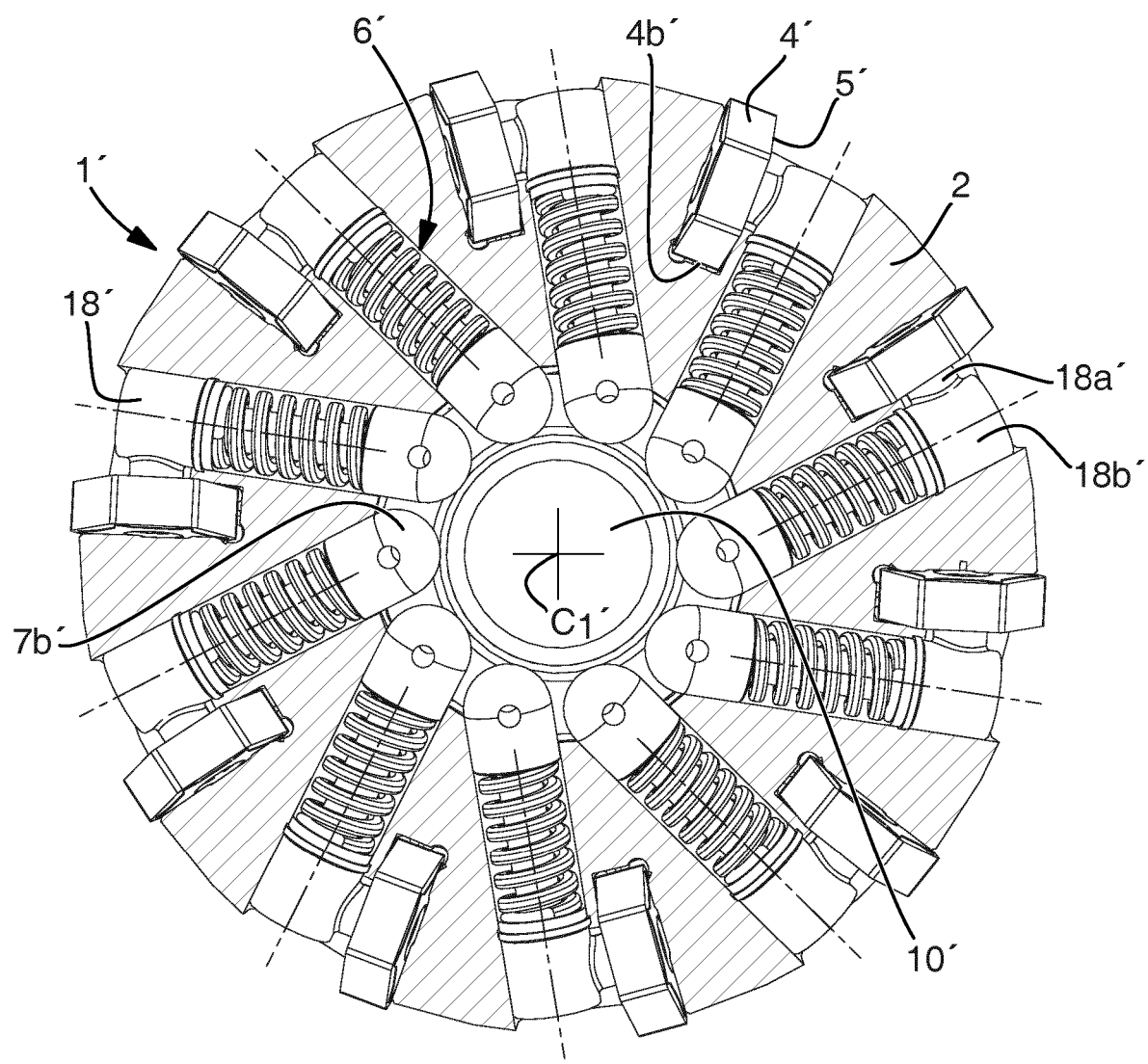
FIG. 8 shows a cross-section of the milling tool in the second embodiment.

The peripheral edge 23' of the disc member 22 allows the radially mounted cutting insert 4' to tilt/turn in the outer indexing position I' while the side (support) surface 4b' of the multi-sided/polygonal shaped cutting insert 4 is supported by the peripheral edge 23'. Thus, the peripheral edge 23' supports the (lowermost) side surface 4b' of the radially mounted cutting insert, while allowing it to turn around its insert centre axis $C_2$ on the cylindrical insert axle 18a' in the outer indexing position I' as the radially mounted cutting insert 4' is pushed further out of the seat 3'. As can be seen in FIGS. 7d-7f, it is not necessary that the side support surfaces 4a', 4b' of the radially mounted cutting insert 4' and the axial/radial contact surfaces 3a', 3b' are aligned after the radially mounted indexable cutting insert 4' has been turned in the outer indexing position I'. The radially mounted indexable cutting insert 4' is merely pushed outwards to the outer indexing position I' so that the axial side support surface 4a' is completely out of contact with the axial contact surface 3a' of the seat 3'. The cutting insert 4' will pivot/turn around the peripheral edge 23' of the disc member 22' (as shown in FIG. 3d) and a new side support surface 4a' of the radially mounted indexable cutting insert 4' will thereby face the axial contact surface 3a' of the seat 3'. The milling tool 1' and the external indexing device 20' are thereafter brought coaxially apart, as can be seen in FIGS. 7e-7f, whereby the central punch 21' disengages the second end 7b' of the shaft member 7' so that the radially mounted cutting insert 4' is pulled back into the seat 3' by the spring biased shaft member 7' of the internal indexing mechanism 6' in the milling tool 1'. The axial and radial contact surfaces 3a', 3b' of the seat 3' will thereafter guide the radially mounted cutting insert 4' into the correct angular position while it slides back into the inner supported position S' in the seat 3'.

The disc member 22' is elastically arranged relative to the central punch 21', such that, when the indexable cutting insert 4' is in the outer indexing position I', the peripheral edge 23' of the disc member 22' is elastically and axially forced against the (lowermost) side support surface 4b' of the indexable cutting insert 4'. More precisely, a bottom side 22b' of the disc member 22' is supported by an elastic member in the form of a wave spring 24', arranged around the central punch 21', wherein the disc member 22' including the peripheral edge 23' exhibits an elastic axial yield in the support of the indexable cutting insert 4' in a short range of motion both toward and away from the peripheral edge 23' during the indexing operation. This provides a continuous support of the lowermost side support surface 4b' of the indexable cutting insert 4' by the peripheral edge 23' shortly before the turning movement is initiated as well as shortly after the indexable cutting insert 4' has been turned, wherein the milling tool 1' and external indexing device 20' are brought coaxially apart. This will also improve the service life of the peripheral edge 23' and the cutting insert 4'. A top side 22a' of the disc member 22' is also provided with a plastic cover (for instance of polyoxymethylene or POM) to reduce the risk of damaging the cutting inserts 4 when these are indexed by the peripheral edge 23'. The wave spring 24' is arranged between the bottom side 22b' of the disc member 22' and a base plate 25' configured for mounting the external indexing device 20'.

The central punch 21' comprises a conical envelope surface 26' configured with an extension 27' in the axial direction and an apex angle α' along the central punch 21' so that it covers the full range of motion for pushing the indexable cutting insert 4' successively more outwards, from the inner supported position S' to the outer indexing position I', as the milling tool 1' and the external indexing device 20' are brought coaxially together. It may be sufficient that the extension 27' in the axial direction of the conical envelope surface 26' is in a range of 10 mm-30 mm to cover the full range of motion for pushing the indexable cutting insert 4' from the inner supported position S' to the outer indexing position I'. In the second embodiment, the extension 27' in the axial direction, which is somewhat longer than necessary for covering the full range of motion. As can be seen in FIGS. 5 and 7, the extension 27' in the axial direction is configured so that a maximum diameter 28' of the conical envelope surface 26' is situated in level with or slightly above the upper reference plane $P_U'$ of the peripheral edge 23' of the disc member 22', wherein the disc member 22' is arranged (mounted) around a remaining cylindrical axial extension 29' of the central punch 21'. The conical envelope surface 26' is also configured with an apex angle α' so that the outer indexing position I' of the indexable cutting insert 4' coincides with the peripheral edge 23' of the disc member 22' (see FIG. 7d). In other words, the radially mounted indexable cutting insert 4' reaches the outer indexing position I' almost simultaneously as the peripheral edge 23' of the disc member 22' provides support to the (lowermost) side support surface 4b' of the radially mounted indexable cutting insert 4'. The apex angle α' may also in this embodiment be designed with the smallest possible angle to achieve a favourable engagement angle between the central punch 21' and the second end 7b' of the shaft member 7'. As previously mentioned a limiting factor for the apex angle α' is however the maximum extension on the punch 21' and the central cavity 10' at the front end of the tool body 1; a smaller apex angle α requires longer punches/central cavities to push the shaft members 7' and indexable cutting inserts 4' sufficiently far out. A sufficient distance that a normal sized radially mounted indexable cutting insert 4 is required to be pushed out of the seat is in a range of for instance 5 mm-10 mm. Hence, the extension 27' in the axial direction on the conical envelope surface 26' as well as the apex angle α' can hereby be configured to provide the necessary distance for pushing the indexable cutting insert 4' to the outer indexing position I' as it reaches the peripheral edge 23' of the disc member 22'.

The invention is of course not limited to the first and second embodiments described above, but may be varied and modified within the scope of the following claims.

The invention claimed is:

1. A milling tool for chip-removing machining comprising:
    a tool body rotatable around a central rotation axis, the tool body including at least one insert seat having a plurality of side contact surfaces;
    at least one indexable cutting insert including an insert center axis around which the at least one indexable cutting insert has a rotational symmetry, wherein the at least one indexable cutting insert has a plurality of side support surfaces, which are situated around the insert center axis and arranged to be supported by the plurality of side contact surfaces of the insert seat; and
    a respective internal indexing mechanism arranged to displace each of the at least one indexable cutting insert between an inner supported position, wherein at least two of the plurality of side support surfaces are supported by at least two side contact surfaces of the plurality of side contact surfaces of the insert seat, and an outer indexing position, wherein the at least two side support surfaces are out of contact with the at least two side contact surfaces,
    each internal indexing mechanism having a shaft member with a shaft center axis extending inside a bore formed in the tool body, the at least one indexable cutting insert being connected to a first end of the shaft member and the shaft member being movably arranged for bringing the at least one indexable cutting insert to the outer indexing position, wherein the shaft member of each internal indexing mechanism is forced toward the inner supported position by a compressible force generator,
    wherein, as seen in a direction parallel to the insert center axis toward the at least one indexable cutting insert, the at least one indexable cutting insert has a multi-sided shape, and the plurality of side support surfaces are included in sides of the at least one indexable cutting insert, the sides extend between a top surface and an opposing bottom surface of the at least one indexable cutting insert, wherein each internal indexing mechanism is arranged to provide a rectilinear movement along the shaft center axis, between the inner supported position and the outer indexing position, wherein the at least one indexable cutting insert is free to turn in both directions around the insert center axis after the at least one indexable cutting insert is moved to the outer indexing position.

2. The milling tool according to claim 1, wherein the bore and the shaft member arranged therein extend in a radial direction of the tool body, wherein a second end of the shaft member of each internal indexing mechanism projects from the bore into a central cavity, which is formed in the tool body and extends coaxially with the central rotation axis of the tool body, and wherein the central cavity is provided in a front end of the tool body.

3. The milling tool according to claim 2, wherein the at least one insert seat is a plurality of insert seats, there is a plurality of indexing mechanisms, and the at least one indexable cutting insert is a plurality of indexable cutting inserts.

4. The milling tool according to claim 1, wherein the at least one indexable cutting insert is a tangentially mounted indexable cutting insert, and wherein the at least two side contact surfaces are arranged to support the indexable cutting insert in an axial direction and a tangential direction of the tool body.

5. The milling tool according to claim 4, wherein each tangentially mounted indexable cutting insert is fixedly mounted to the first end of the shaft member with the insert center axis arranged coaxially with the shaft center axis, and wherein each tangentially mounted indexable cutting insert is free to turn in both directions around the insert center axis in the outer indexing position by the shaft member being rotatably supported inside the bore around the shaft center axis.

6. The milling tool according to claim 5, wherein each tangentially mounted indexable cutting insert includes a central through-hole arranged coaxially with the insert center axis, wherein the first end of each shaft member includes an internally threaded hole extending coaxially with the shaft center axis, and wherein each tangentially mounted indexable cutting insert is directly connected to the first end of each shaft member, respectively, with an insert screw mounted in the central through-hole into the internally threaded hole.

7. The milling tool according to claim 1, wherein the at least one indexable cutting insert is a radially mounted cutting insert, and wherein the at least two side contact surfaces are arranged to support the indexable cutting insert in an axial and a radial direction of the tool body.

8. The milling tool according to claim 7, wherein each radially mounted indexable cutting insert is connected to the first end of the shaft member via an insert head, wherein the insert head includes a cylindrical insert axle extending transverse to the shaft center axis and each indexable cutting insert includes a central through-hole extending coaxially with the insert center axis, wherein each cylindrical insert axle is arranged, respectively, in the central through-hole so that the indexable cutting insert is free to turn around the insert center axis on the cylindrical insert axle in the outer indexing position.

9. The milling tool according to claim 8, wherein the insert head includes a cylindrical main body portion extending coaxially with the shaft center axis to moveably support the shaft member's rectilinear movement along the shaft center axis in the bore of the tool body.

10. An indexing system comprising:
the milling tool according to claim 1; and
an external indexing device including a central punch protruding from a disc member arranged concentric with the central punch, wherein the central punch is arranged for pushing a second end of each shaft member of each internal indexing mechanism so that each of the at least one indexable cutting insert is displaced to the outer indexing position, wherein the disc member is configured with an annular geometry arranged to engage one of the sides on the at least one indexable cutting insert and, the external indexing device is configured to turn each of the at least one indexable cutting insert around the insert center axis toward another index position via a relative movement provided between the milling tool and the external indexing device.

11. The indexing system according to claim 10, wherein the annular geometry of the disc member includes a sawtooth shape, the sawtooth shape having a front surface and a back surface, wherein the front surface is arranged to engage one of the plurality of side support surfaces on each of the at least one cutting insert, wherein the relative movement is a rotational movement of the milling tool relative to the external indexing device, wherein the back surface extends along a ramp angle in relation to an upper reference plane of the sawtooth shaped annular geometry.

12. The indexing system according to claim 10, wherein the disc member is elastically arranged relative to the central punch, such that, when the indexable cutting insert is in the outer indexing position, the annular geometry of the disc member is elastically and axially forced against the indexable cutting insert.

13. The indexing system according to claim 10, wherein the central punch has a conical envelope surface configured for pushing each of the at least one indexable cutting insert successively more outwards, from the inner supported position to the outer indexing position, as the milling tool and the external indexing device are brought together in a coaxial arrangement relative to the central rotation axis of the milling tool.

* * * * *